No. 788,201. PATENTED APR. 25, 1905.
S. H. FRIEND.
FISH HOOK.
APPLICATION FILED AUG. 24, 1904.
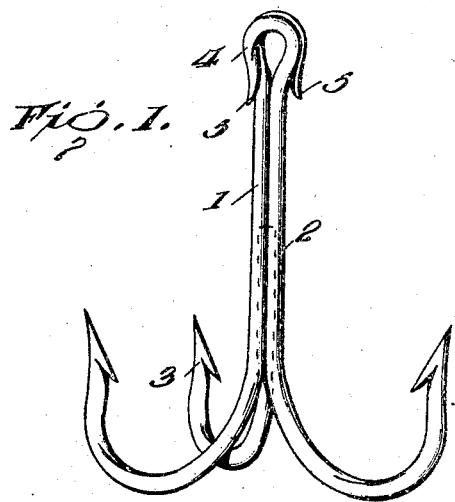
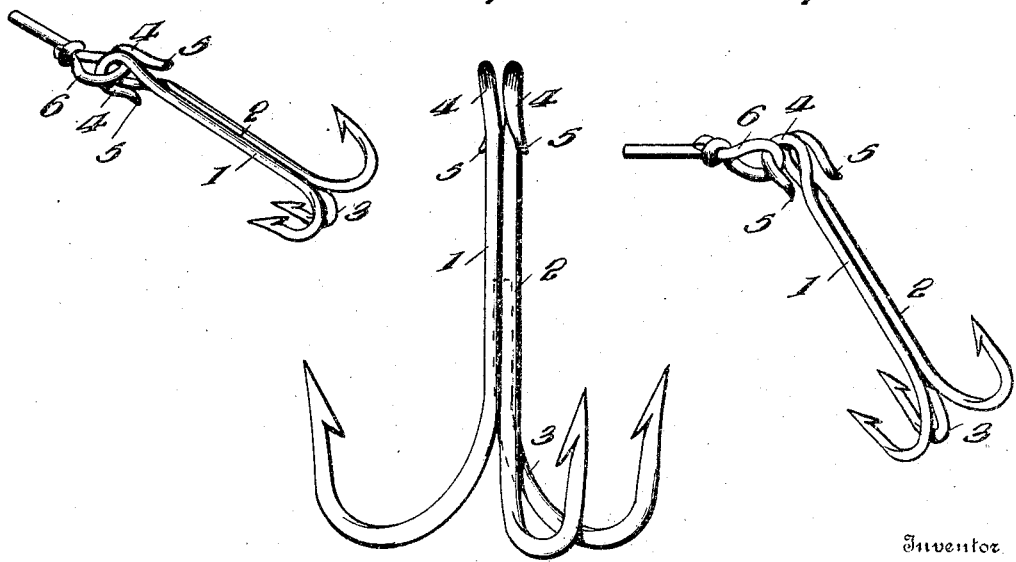

No. 788,201. Patented April 25, 1905.

UNITED STATES PATENT OFFICE.

SAMUEL H. FRIEND, OF KENT, OHIO.

FISH-HOOK.

SPECIFICATION forming part of Letters Patent No. 788,201, dated April 25, 1905.

Application filed August 24, 1904. Serial No. 222,030.

*To all whom it may concern:*

Be it known that I, SAMUEL H. FRIEND, a citizen of the United States, residing at Kent, in the county of Portage and State of Ohio, have invented certain new and useful Improvements in Fish-Hooks; and I do hereby declare that the following is a full, clear, and exact description of the same, reference being had to the annexed drawings, making a part of this specification, and to the figures of reference marked thereon, in which—

Figure 1 is a view showing three hooks connected together and illustrating a side view of the connecting-loop. Fig. 2 is a similar view showing an edge of the connecting-loop. Fig. 3 is a view of the hooks and illustrating the loop open and showing the eye partially connected. Fig. 4 is a view showing the eye fully connected to the loop.

The present invention has relation to fish-hooks, and especially to the manner of connecting the eye to the loop of the hook proper.

Similar numerals of reference indicate corresponding parts in all the figures of the drawings.

In the accompanying drawings, 1 and 2 represent the hooks proper, and, as shown, the backs of the hooks are located against each other throughout their straight portions. If desired, a third hook 3 or any desired number of additional hooks may be secured in relative position and the straight portions of all the hooks of a cluster secured together in the usual manner.

The hooks 1 and 2 are each provided with the loops 4, which loops have the terminating points 5, which terminating points are located in opposite relation to each other—as, for instance, in Fig. 1 one of the terminating points is upon the right-hand side and the other upon the left-hand side. The object and purpose of so locating the terminating points of the loops is to provide a means for so attaching the eye 6 that it will not become accidentally detached.

It will be understood that the eye 6 is to be attached to a decoy fish or other object, as desired, and is formed in the usual manner. In the drawings the loops 4 are shown somewhat open; but it will be understood that these loops should be so formed that the points 5 can be easily inserted in the eye 6, and for better illustrating this in Figs. 3 and 4 the points 5 are shown slightly spaced at their extreme ends from the bodies or shanks of the hooks.

In use the eye 6 is first placed in the position illustrated in Fig. 3 and is carried around until it is brought into such a position that the opposite point 5 can be inserted through said eye, thereby connecting the eye to the double loop of the hook.

It will be understood that by my peculiar manner of locating the loops so as to form what might be termed a "double" loop and arranging the points of the loop upon opposite sides the eye can be easily attached and detached; but the eye will not become accidentally detached, owing to the fact that it must be carried down so as to come beyond one of the points and again brought up and down to detach it from the opposite side of the loop, or, in other words, to remove the eye from the opposite points. Of course it will be understood that the loops should be located so that their adjacent sides will be near or touch each other when in their normal position, and as the eye 6 is passed between the two adjacent loops they will spring apart sufficiently to allow the movement of the eye for detaching and attaching the same.

Having fully described my invention, what I claim as new, and desire to secure by Letters Patent, is—

1. A plurality of hooks, two of which are provided each with a loop at the upper end of its shank, and the terminating points of the loops spaced in opposite directions from the respective shanks on which they are formed, substantially as and for the purpose specified.

2. A plurality of hooks, two of which are provided each with a loop at the upper end of its shank, and said loops open at the terminating points thereof located in opposite directions from the respective shanks on which they are formed, substantially as and for the purpose specified.

In testimony that I claim the above I have hereunto subscribed my name in the presence of two witnesses.

SAMUEL H. FRIEND.

Witnesses:
 W. W. REED,
 DAISY EVERETT.